United States Patent
Clifton

(10) Patent No.: US 6,976,043 B2
(45) Date of Patent: Dec. 13, 2005

(54) TECHNIQUE FOR APPROXIMATING FUNCTIONS BASED ON LAGRANGE POLYNOMIALS

(75) Inventor: Daniel B. Clifton, Rockledge, FL (US)

(73) Assignee: ATI Technologies Inc., Thornhill (CA)

( * ) Notice: Subject to any disclaimer, the term of this patent is extended or adjusted under 35 U.S.C. 154(b) by 640 days.

(21) Appl. No.: 09/918,346

(22) Filed: Jul. 30, 2001

(65) Prior Publication Data

US 2003/0037080 A1 Feb. 20, 2003

(51) Int. Cl.$^7$ ................................. G06F 1/02
(52) U.S. Cl. ................. 708/277; 708/276; 708/272
(58) Field of Search ................. 708/272, 270, 708/271, 276, 277

(56) References Cited

U.S. PATENT DOCUMENTS

| | | | | |
|---|---|---|---|---|
| 4,583,188 A | * | 4/1986 | Cann et al. | 708/277 |
| 5,041,999 A | * | 8/1991 | Nakayama | 708/277 |
| 5,068,816 A | * | 11/1991 | Noetzel | 708/270 |
| 5,831,878 A | * | 11/1998 | Ishida | 708/277 |
| 5,951,629 A | * | 9/1999 | Wertheim et al. | 708/277 |
| 6,115,726 A | * | 9/2000 | Ignjatovic | 708/300 |
| 6,240,433 B1 | * | 5/2001 | Schmookler et al. | 708/270 |
| 6,373,535 B1 | * | 4/2002 | Shim et al. | 348/745 |
| 6,711,601 B2 | * | 3/2004 | Inoue et al. | 708/277 |

* cited by examiner

*Primary Examiner*—Tan V. Mai
(74) *Attorney, Agent, or Firm*—Vedder, Price, Kaufman & Kammholz, P.C.

(57) ABSTRACT

A technique for approximating output values of a function based on LaGrange polynomials is provided. Factorization of a LaGrange polynomial results in a simplified representation of the LaGrange polynomial. With this simplified representation, an output value of a function may be determined based on an input value that includes an input mantissa and an input exponent. Based on a first portion of the input mantissa, a point value and at least one slope value are provided. Each of the at least one slope value is based on a LaGrange polynomial approximation of the function. Thereafter, the point value and the at least one slope value are combined with a second portion of the input mantissa to provide an output mantissa. Based on this technique, a single set of relatively simple hardware elements may be used to implement a variety of functions with high precision.

16 Claims, 5 Drawing Sheets

- PRIOR ART -

- PRIOR ART -

TECHNIQUE FOR APPROXIMATING FUNCTIONS BASED ON LAGRANGE POLYNOMIALS

TECHNICAL FIELD OF THE INVENTION

The present invention generally relates to computation devices that calculate the value of a function using hardware implemented approximation techniques and, in particular, a technique for calculating such approximations based on LaGrange polynomials.

BACKGROUND OF THE INVENTION

Computation devices that perform arithmetic operations are well known in the art. In order to perform such operations, these computation devices typically comprise an arithmetic logic unit or the like. The arithmetic logic unit or, as it is sometimes referred to, a math engine, implement circuitry in hardware used to perform separate arithmetic functions. Such functions range from relatively simple operations such as addition and multiplication to more complex operations such as exponents, logarithms, inverses and the like. While a variety of techniques exist in the prior art for approximating the values of more complex functions, a technique that is often used relies on tables of point values and slope values to approximate the output value of a function.

Referring to FIGS. 1–3, there is illustrated an example of the use of point and slope values to approximate the output value of a function. Referring to FIG. 1, an arbitrary function 102 is illustrated as a continuous line. For each of a plurality of known, discrete input values, labeled $x_0$ through $x_p$, there are corresponding known output values, labeled $f(x_0)$ through $f(x_p)$. The discrete input values are often referred to as points, whereas the output values are referred to as point values. Furthermore, linear approximations of the function between the point values are referenced in terms of slopes. This is further illustrated in FIG. 2.

In FIG. 2, a plurality of point values labeled $x_J$, $X_{J+1}$ and $X_{J+2}$, and their corresponding output values $f(x_J)$, $f(x_{+1})$ and $f(x_{J+2})$ according to an arbitrary function 202 are shown. Between each of the points, linear approximations 204, 206 of the curve 202 are also shown. Each of the linear approximations 204, 206 is characterized by a slope, m, according to well known geometry principles. When attempting to approximate the output value, f(x), for an arbitrary input, x, it is first determined which point the input value x is closest to. In the example illustrated in FIG. 2, the input value x falls between the points $x_J$ and $x_{J+1}$. In particular, the input value, x, differs from the point, $x_J$, by value, $\Delta x$, as illustrated. Using the well known equation for a line, the approximated (or estimated) output value, f'(x), corresponding to the input value, x, may be calculated according to the equation:

$$f'(x) = f(x_J) + m\Delta x \qquad \text{(Eq. 1)}$$

The difference between the estimated output value, f'(x), and the true output value, f(x), as shown in FIG. 2, is the error that results from the approximation nature of the method illustrated in FIG. 2. Assuming that a sufficient number of points and point values are used, the error resulting from the above described method can be kept relatively small, while still maintaining the relative ease of implementation of this method. A technique for implementing this method is further illustrated with respect to FIG. 3.

The technique previously described with respect to FIG. 2 may be implemented using a point table 302, a slope table 304, a multiplier 306 and an adder 308. The implementation illustrated in FIG. 3 operates upon input values represented as a signed mantissa and an exponent value. Equation 2 below illustrates a signed mantissa and exponent, base-2 representation.

$$\text{Value} = (+/-)\text{Mantissa} \times 2^{Exponent} \qquad \text{(Eq. 2)}$$

In essence, the mantissa represents the significant digits of a value and the exponent value represents a relative magnitude of the significant digits. A sign bit labeled S in the figures, indicates whether the mantissa value is positive or negative. In this manner, a very large range of values may be represented depending on the number of bits used. The mantissa, x, may be further divided into a first portion, labeled $x_0$, and a second portion, labeled $\Delta x$. As shown the first portion comprises the most significant bits of the mantissa and define the points as previously described. For example, if the first portion comprises the five most significant bits, there are 32 points available. The remaining least significant digits define the second portion illustrated as $\Delta x$ in FIG. 3. In implementing Equation 1, the first portion of the mantissa, or point, is used to reference the point table 302 to provide a corresponding point value, $f(x_0)$. Likewise, the first portion of the mantissa is also used to index the slope table 304 to provide a corresponding slope value, m. The values in the point tables 302 and the corresponding values in the slope tables 304 are constants defined according to the equation being approximated. Furthermore, the values in the point table 302 and slope table 304 are defined over a limited range for which the approximation is valid. As shown, the resulting slope value, m, is multiplied by the value of the second portion of the mantissa, $\Delta x$, by the multiplier 306 and the resulting product is added to the point value, $f(x_0)$, by the adder 308. The output of the adder 308 is the mantissa of the output of the function.

Additionally, sign/exponent processing 310 is performed on the input value sign and exponent in order to provide the output value sign and exponent, as shown in FIG. 3. The particular processing implemented by the sign/exponent processing block 310 depends upon the representation of the exponent as well as the particular function being approximated. For example, in order to avoid negative exponent values, it is a common practice to add an offset to the exponent value equivalent to a mid-point of the range of values that may be represented by the exponent. Thus, if 8 bits are used to represent exponents, an offset of 128 will prevent any negative exponent values. This is illustrated in Table 1.

TABLE 1

| Exponent Without Offset | Exponent With Offset |
|---|---|
| −128 | 0 |
| 0 | 128 |
| 128 | 256 |

In order to operate upon the exponent, it therefore becomes necessary to first remove the offset when processing the exponent and, when processing is completed, to add the offset value once again. Additionally, the nature of the function being approximated affects the processing of the exponent. For example, where an inverse function is being implemented, processing of the true value of the exponent can be as simple as a inverting each binary bit of the biased exponent value and then subtracting two (one if the input is an exact multiple of 2.0). In another example, implementation of a square root function requires subtracting the biased exponent value from 381 (383 if the input is an exact multiple of 4.0), then dividing by two. Such sign and exponent processing is well known to those having ordinary skill in the art.

Regardless, as can be seen in FIG. 3, the implementation of this technique is relatively simple, requiring only two tables, a multiplier and an adder. However, the precision obtainable by this technique is limited by the number of values stored in the point table 302 and slope table 304. That is, greater precision is only gained by significantly enlarging the overall size of the point table 302 and slope table 304. In some instances, the required precision may lead to a prohibitively large set of tables. For example, the so-called DirectX8 standard calls for up to 22 bits of precision when calculating reciprocal values and reciprocal square root values. The size of the tables required to achieve this level of precision using the implementation shown in FIG. 3 would be prohibitively large. Therefore, a need exists for a technique that provides the necessary precision when approximating arithmetic functions and that is relatively simple to implement.

BRIEF DESCRIPTIONS OF THE DRAWINGS

DETAILED DESCRIPTION OF THE PREFERRED EMBODIMENT

The present invention provides a technique for approximating output values of a function based on LaGrange polynomials. More particularly, the present invention takes advantage of the superior accuracy of LaGrange polynomials using a hardware implementation that requires substantially less circuitry that would otherwise be required to directly implement a LaGrange polynomial. To this end, the present invention relies on a factorization of a LaGrange polynomial that results in a representation of the LaGrange polynomial requiring substantially less hardware and a relatively modest amount of memory to implement tables.

With this simplified representation, an output value of a function may be determined based on an input value comprising an input mantissa and an input exponent. Based on a first portion of the input mantissa, a point value is provided. Additionally, at least one slope value based on the first portion of the input mantissa is also provided. Each of the at least one slope value is based on a LaGrange polynomial approximation of the function. Thereafter, the point value and the at least one slope value are combined with a second portion of the input mantissa to provide an output mantissa. Likewise, conventional techniques for processing an exponent value are used to process the input exponent value. In a preferred embodiment, where an exponential function is being implemented, the input value is first converted to fixed point format such that the input values fall within a valid range of the function. Otherwise, the input value is taken in unchanged. Based on this technique, a single set of hardware may be used to implement a variety of functions such as a reciprocal function, a reciprocal square root function, an exponential function and a logarithmic function. Furthermore, relatively high precision is achievable using a relatively simple hardware embodiment. This technique may be implemented in a variety of computing platforms and, in particular, in a graphics processing circuit.

Figure 4:
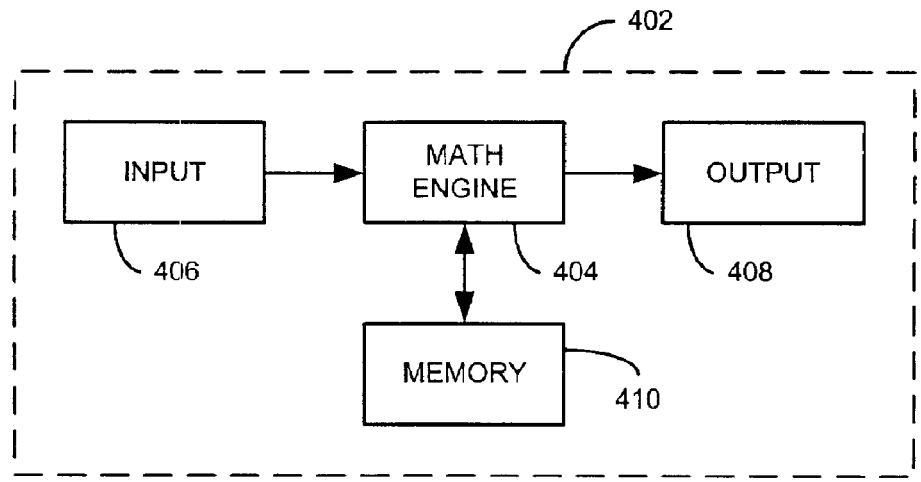
FIG. 4 is a block diagram of a graphics processing circuit in accordance with the present invention.

The present invention may be more fully described with reference to FIGS. 4–7. Referring now to FIG. 4, there is illustrated a graphics processing circuit 402 comprising a math engine 404 coupled to an input 406, an output 408 and a memory 410. As known in the art, the graphics processing circuit 402 may comprise a large-scale integrated circuit capable of operating upon input data, based on a stored or fixed set of instructions, to provide output data. For example, the graphics processing circuit 402 may be embodied by a dedicated graphics processing chip, a microprocessor or any other similar device that would benefit from an improved technique for approximating the value of arithmetic functions. Likewise, the present invention may be incorporated into any computing device that performs arithmetic functions. An example of a suitable circuit that may benefit from the present invention is the "RADEON" family of graphics processor and its successors by ATI Technologies, Inc. The math engine 404 comprises the circuitry used to implement arithmetic functions. Data to be operated upon by the math engine 404 is provided by an input 406 and, subsequent to operation by the math engine upon such data, provided to an output 408. The input and output blocks 406, 408 may be used, as known in the art, to condition and store the data to insure the smooth flow of data through the math engine 404. The memory 410, in addition to storing variables used by the math engine 404, also stores tables of constants used by the math engine 404 when implementing the arithmetic functions. Alternatively, such tables used to implement the arithmetic functions may be integral to the math engine 404 itself. Regardless, the present invention is preferably implemented by the math engine 404 as described in greater detail below.

Figure 5:
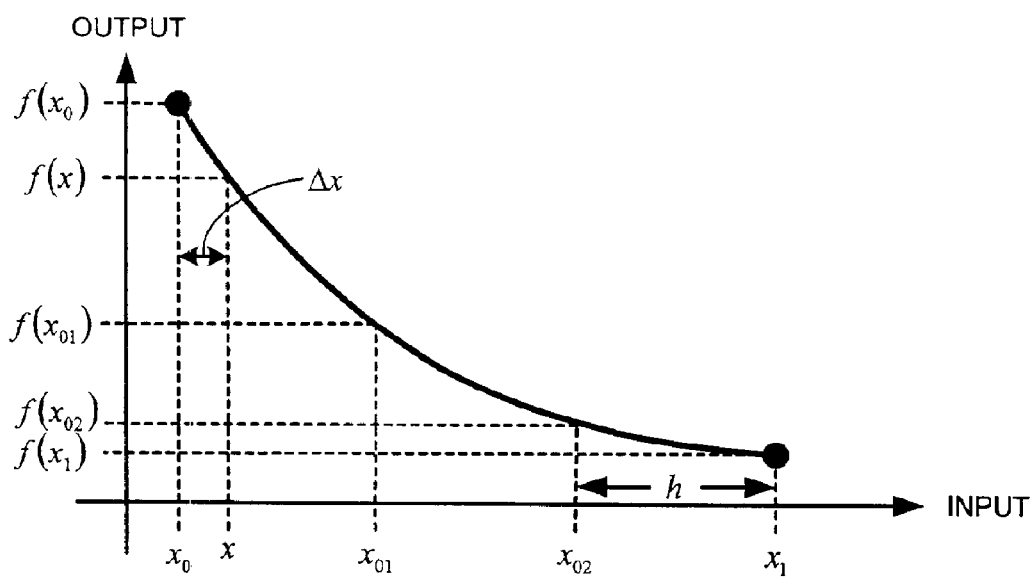
FIG. 5 is a plot illustrating a technique for approximating the value of a function in accordance with the present invention.

Referring now to FIG. 5, a technique for approximating the output value of a function based on LaGrange polynomial is illustrated. A general form of a LaGrange polynomial is illustrated in Equation 3 below.

$$\hat{f}(x) = \sum_{k=0}^{n-1} \prod_{\substack{j=0 \\ j \neq k}}^{n-1} \frac{(x-x_j)}{(x_k-x_j)} f(x_k) \quad \text{(Eq. 3)}$$

In general, LaGrange polynomials offer a technique for interpolating (i.e., approximating) an output value of a function, f(x), based on a set of known input and output values. This is illustrated in FIG. 5. A first point, $x_0$, a second point, $x_1$, sub-points, $x_{01}$ and $x_{02}$, corresponding to the first point, and their corresponding output values, $f(x_0)$, $f(x_{01})$, $f(x_{02})$ and $f(x_1)$, are illustrated. In effect, the sub-points, $x_{01}$ and $x_{02}$, and the second point, $x_1$, provide additional information, in addition to the first point and first point value, whereby the output value for an unknown input value x may be more accurately estimated. Each of the sub-points is separated from the other sub-points and points by a step size, h, such that the sub-points are equally distributed along the curve between the first point, $x_0$, and the second point, $x_1$. Assuming that the value of each point and its corresponding sub-points, as well as their corresponding output values, are known, Equation 3 could be directly implemented to determine an estimate of an output value of a function. For example, Equation 4 illustrates a third-order LaGrange polynomial corresponding to FIG. 5.

$$\hat{f}(x) = f(x_0)\left[\frac{(x-x_{01})(x-x_{02})(x-x_1)}{(x_0-x_{01})(x_0-x_{02})(x_0-x_1)}\right] + \quad \text{(Eq. 4)}$$
$$f(x_{01})\left[\frac{(x-x_0)(x-x_{02})(x-x_1)}{(x_{01}-x_0)(x_{01}-x_{02})(x_{01}-x_1)}\right] +$$
$$f(x_{02})\left[\frac{(x-x_0)(x-x_{01})(x-x_1)}{(x_{02}-x_0)(x_{02}-x_{01})(x_{02}-x_1)}\right] +$$
$$f(x_1)\left[\frac{(x-x_0)(x-x_{01})(x-x_{02})}{(x_1-x_0)(x_1-x_{01})(x_1-x_{02})}\right]$$

Simple inspection, however, of Equation 4 makes it clear that a substantial number of multiplications and additions would be require to directly implement a third-order LaGrange polynomial. In order to simplify the implementation of Equation 4, equivalent values for the sub-points, $x_{01}$, $x_{02}$ and $x_1$, illustrated in Equations 5–7, are substituted in to Equation 4, which is subsequently expanded.

$$x_{01} = x_0 + h \quad \text{(Eq. 5)}$$
$$x_{02} = x_0 + 2h \quad \text{(Eq. 6)}$$
$$x_1 = x_0 + 3h \quad \text{(Eq. 7)}$$

Figure 1:
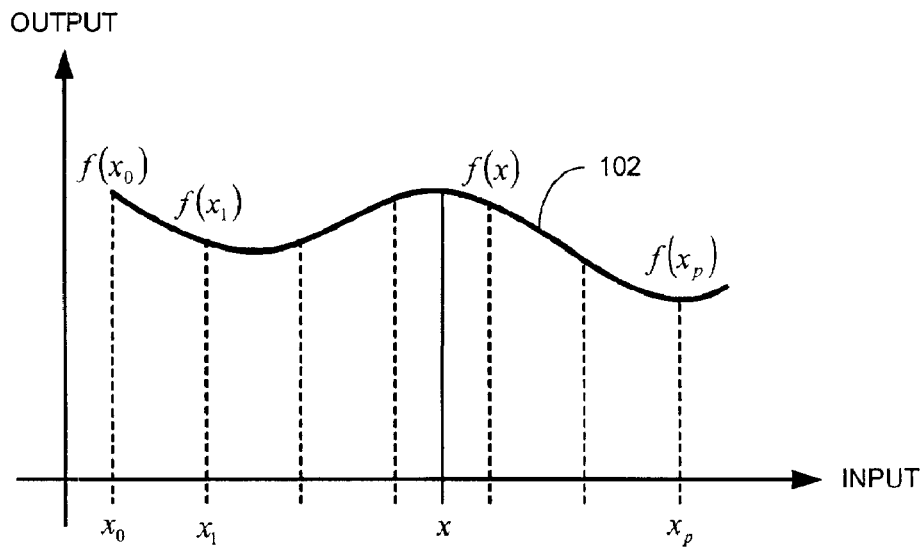
FIGS. 1–3 illustrate a technique for approximating the value of a function in accordance with prior art techniques.
Figure 2:
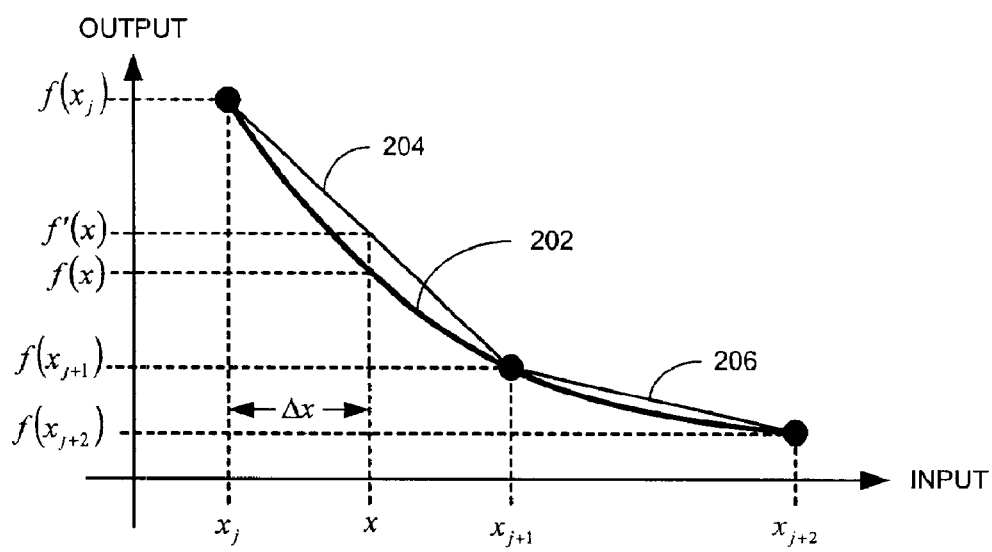
Figure 3:
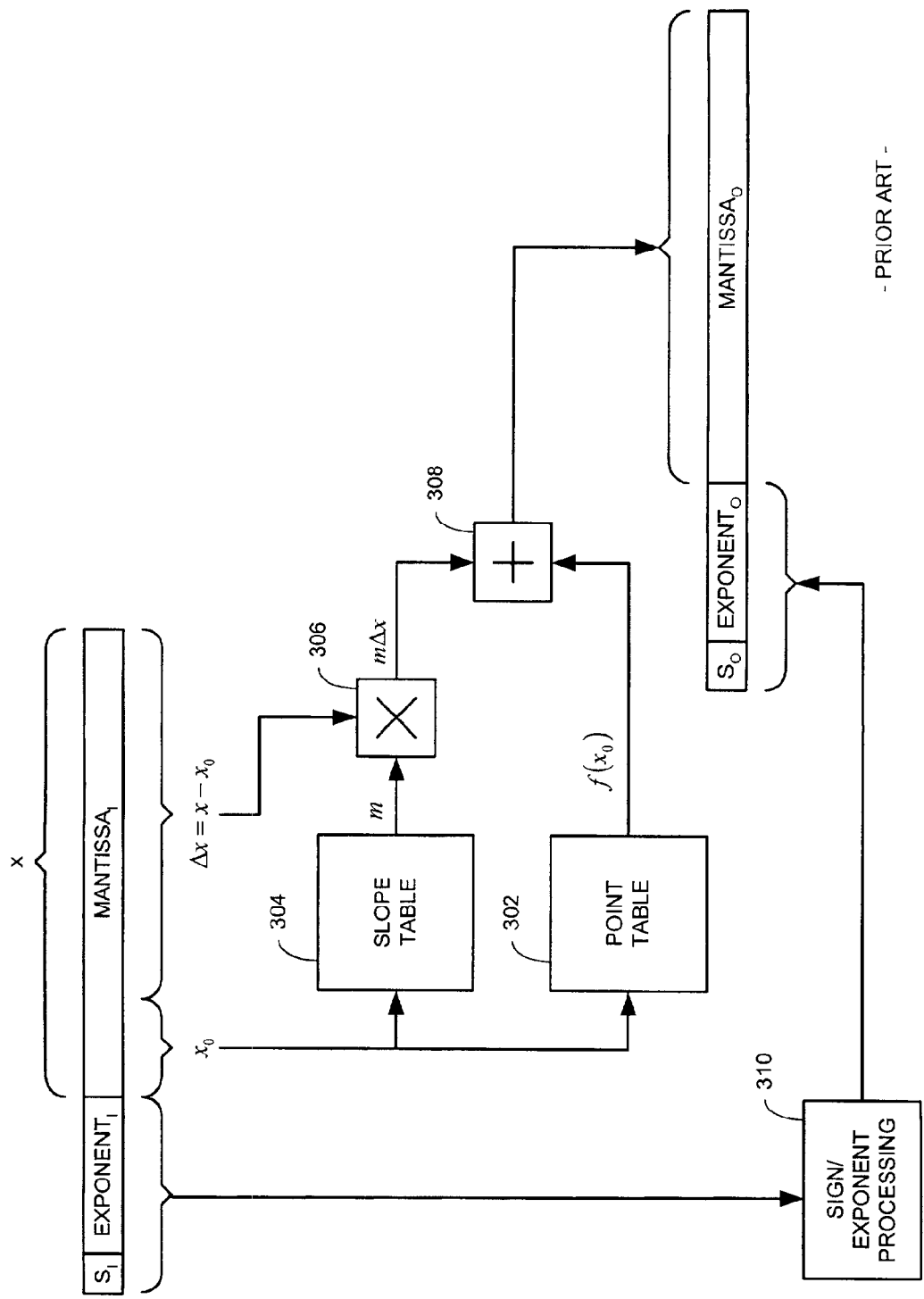

The resulting equation is thereafter factored for successive powers of the quantity $(x-x_0)$, i.e., 1, $(x-x_0)$, $(x-x_0)^2$ and $(x-x_0)^3$. For ease of illustration, it is noted that $\Delta x = x - x_0$, as illustrated in FIG. 3. Through this process of factorization, the relatively complex implementation of Equation 4 can be reduced to the implementation illustrated in Equation 8.

$$\hat{f}(x) = \sum_{i=0}^{n-1} a_i (\Delta x)^i \quad \text{(Eq. 8)}$$

As shown in Equation 8, the approximation reduces to a series of constant values multiplied by successive powers of the quantity $\Delta x$. The particular values for the constants $a_0$ through $a_3$ illustrated in Equation 8 for a third-order LaGrange polynomial are shown in Equations 9–12 below.

$$a_0 = f(x_0) \quad \text{(Eq. 9)}$$
$$a_1 = \frac{1}{3h}[-5.5f(x_0) + 9f(x_{01}) - 4.5f(x_{02}) + f(x_1)] \quad \text{(Eq. 10)}$$
$$a_2 = \frac{1}{9h^2}[9f(x_0) - 22.5f(x_{01}) + 18f(x_{02}) - 4.5f(x_1)] \quad \text{(Eq. 11)}$$
$$a_3 = \frac{1}{27h^3}[-4.5f(x_0) + 13.5f(x_{01}) - \quad \text{(Eq. 12)}$$
$$13.5f(x_{02}) + 4.5f(x_1)]$$

Recall that the point values (i.e., $f(x_0)$, $f(x_1)$ and $f(x_{0i})$) corresponding to the point and sub-points are known values and are dependent upon the particular function being implemented. As a result of this simplification, Equation 8 may be implemented in a relatively straight-forward fashion as further illustrated in FIGS. 6 and 7.

Figure 6:
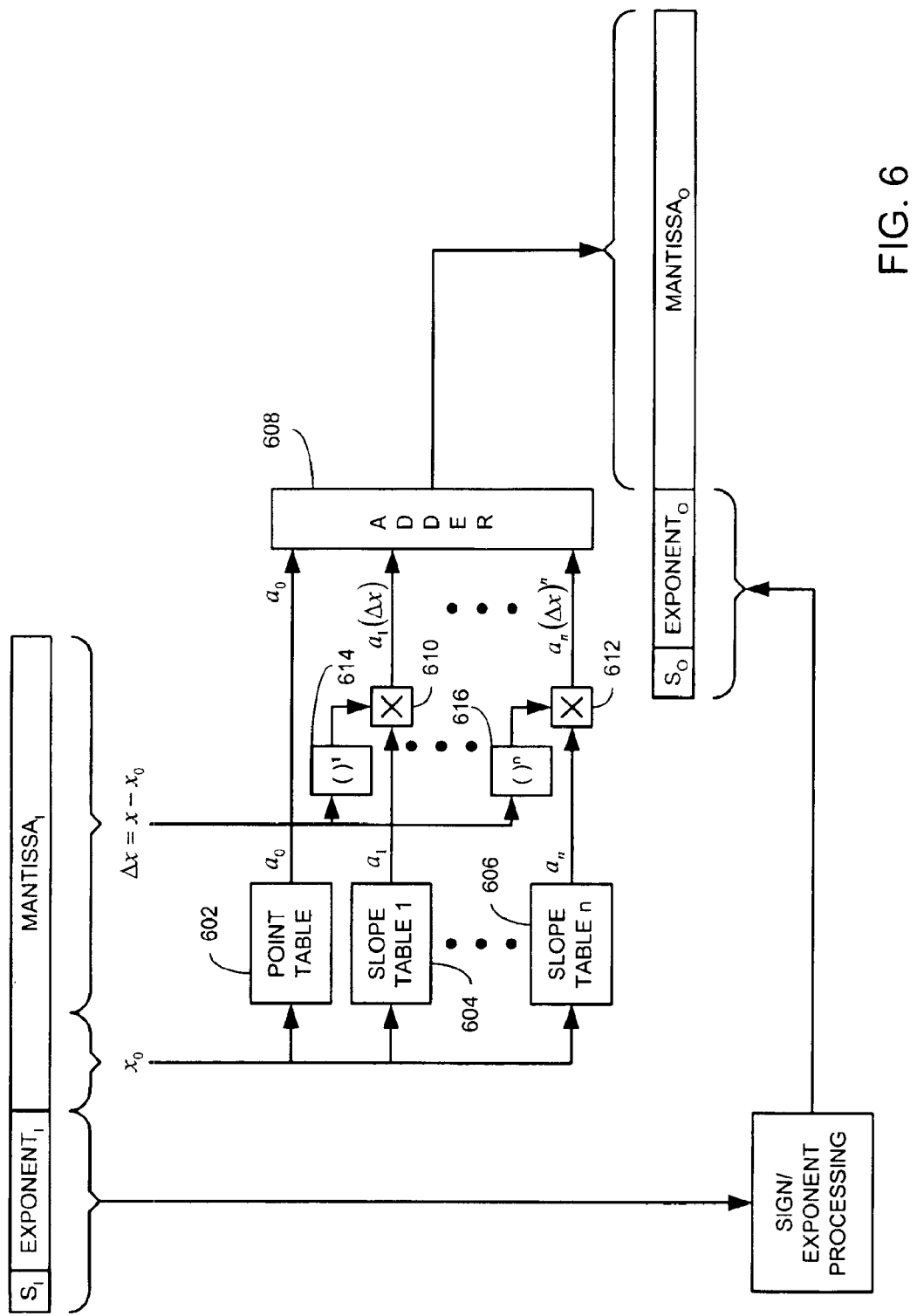
FIG. 6 is a block diagram illustrating a generalized technique for approximating function values in accordance with the present invention.

Referring now to FIG. 6, a generalized implementation of an nth-order LaGrange polynomial in accordance with the present invention is shown. A first portion of the input mantissa, corresponding to a point, $x_0$, is used to index a point table 602 and a plurality of slope tables 604, 606. Each of the tables 602–604 stores a value uniquely corresponding to each possible value of the first portion of the mantissa, i.e., to each point. Based on the value of the first portion, the constants $a_0$ through $a_n$ are provided by the tables 602–606. Thereafter, multipliers 610–612 are used to multiply the constant values by successive powers of $\Delta x$, provided by exponential functions 614–616, as shown. An adder 608 thereafter calculates the sum of the outputs of the multiplier 610–612 as well as the output of the point table 602. The resulting sum output by the adder 608 is the mantissa of the output value according to the function being implemented. The sign and exponent processing is handled in a manner equivalent to that previously described.

Figure 7:
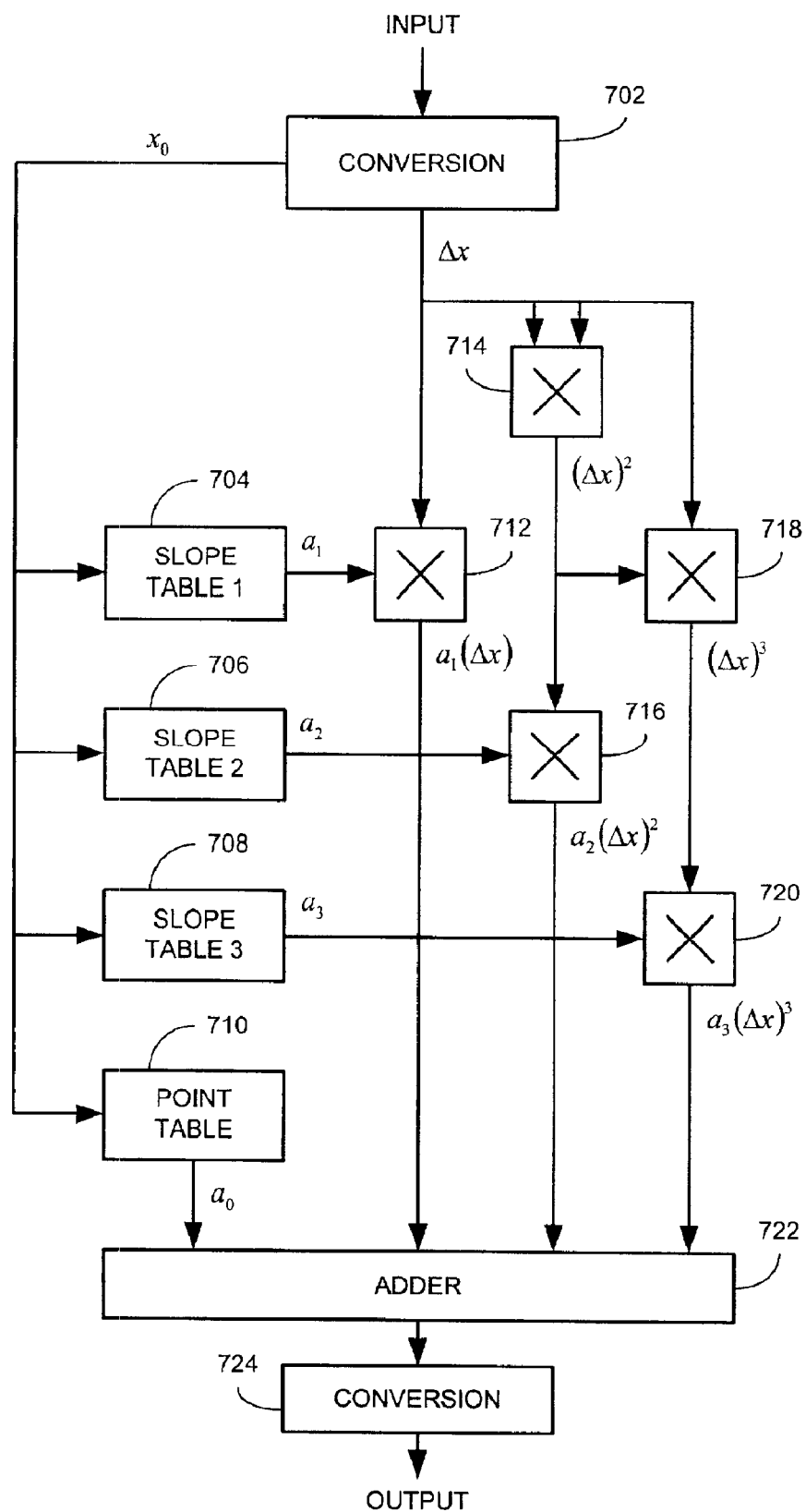
FIG. 7 is a block diagram of a preferred implementation of the present invention based on a third-order LaGrange polynomial.

Referring now to FIG. 7, a preferred embodiment based on a third-order LaGrange polynomial is illustrated. Note that FIG. 7, for ease of illustration, does not show any sign or exponent processing. Where an exponential function is being implemented, input values are first provided to a float-to-fixed conversion circuit 702, as known in the art, which insures that the input values fall within a predefined valid range for the function being implemented. Such input ranges are a matter of design choice, and may be chosen arbitrarily depending on the particular application. For example, a valid range for an exponent function may be between 1 and 2; a valid range for a logarithmic function may be 2 to 4; a valid range for a reciprocal function may be 1 to 2; and a valid range for a reciprocal square root function may be 2 to 8.

The first portion of the input mantissa, xo, is used to index the tables 704–710 to provide the corresponding constant values. Likewise, the second portion of the input mantissa, $\Delta x$, is provided as an input to the multipliers having reference numerals 712, 714, 718. Multiplier 712 multiplies the first constant, $a_1$, with a first-order power of $\Delta x$ as shown. Multiplier 714 provides a second-order power of $\Delta x$, which is thereafter multiplied by the second constant value, $a_2$, by multiplier 716 as shown. The output of multiplier 714 is also provided as an input to multiplier 718 which in turn provides a third-order power of $\Delta x$. The third-order power of $\Delta x$ is thereafter multiplied by the third constant, $a_3$, by multiplier 720. The resulting products are provided to an adder 722 along with the point value, $a_0$, to provide a sum representative of the mantissa of the approximated output value. The output of the adder 722 is thereafter concatenated to the unbiased input exponent and provided to a fixed-to-float conversion circuit 724 which converts the fixed point value to floating point form using known techniques. Preferably, this floating point value is only used if the function being implemented is the logarithmic function.

The present invention overcomes the limitations of prior art techniques by providing a relatively inexpensive implementation of LaGrange polynomials while simultaneously providing substantially similar or better accuracy than these prior art techniques. For example, the implementation of the third-order LaGrange polynomial illustrated in FIG. 7 is capable of providing up to 23 bits of precision for reciprocal, reciprocal square root functions, exponential, and logarithmic functions within the valid ranges for these functions. In such an implementation, for each function implemented, the point table 710 comprises 32 point values of at least 24 bits of accuracy; the first slope table 704 comprises 32 constant values of at least 20 bits of accuracy; the second slope table 706 comprises 32 constant values of at least 16 bits of accuracy; and the third slope table 708 comprise 32 constant values of at least 12 bits of accuracy. Likewise, the first multiplier 712 comprises a 20-bit multiplier; the second and third multipliers 714, 716 comprise 16-bit multipliers; the fourth and fifth multipliers 718, 720 comprise 12-bit multipliers; and the adder 722 comprises a 26-bit adder.

Of equal importance, the hardware implementation illustrated in FIG. 7 may be reused to implement different functions simply by substituting different tables for the point and slope value tables. In this manner, the present invention provides a highly flexible and efficient technique for implementing arithmetic functions.

The present invention substantially overcomes the limitations of prior art techniques for approximating function output values. To this end, a simplified form of LaGrange polynomials is used which provides greater accuracy for a variety of functions using a single set of implementation hardware. As a result, a cost benefit is realized because different functions may be implemented using the same hardware, while still achieving the same or better accuracy.

The foregoing description of a preferred embodiment of the invention has been presented for purposes of illustration and description, it is not intended to be exhaustive or to limit invention to the precise form disclosed. The description was selected to best explain the principles of the invention and practical application of these principles to enable others skilled in the art to best utilize the invention and various embodiments, and various modifications as are suited to the particular use contemplated. For example, arithmetic functions other than those listed above may be implemented in accordance with the present invention. Thus, it is intended that the scope of the invention not be limited by the specification, but be defined by the claims set forth below.

I claim:

1. In a graphics processing circuit, a method for calculating an output value of a function based on an input value, wherein the input value comprises an input mantissa and an input exponent, the input mantissa further comprising a first portion and a second portion, and wherein the output value comprises an output mantissa and an output exponent, the method comprising:
   converting the input value such that the input mantissa is within a predefined range;
   providing a point value stored in memory based on the first portion of the input mantissa;
   providing at least one slope value stored in memory based on the first portion of the input mantissa, wherein each of the at least one slope value is based on a LaGrange polynomial approximation of the function; and
   combining, using a combining circuit, the point value, the at least one slope value and the second portion of the input mantissa to provide the output mantissa.

2. The method of claim 1, wherein the function is any function selected from a group comprising: a reciprocal function, a reciprocal square root function, an exponential function and a logarithm function.

3. The method of claim 1, wherein the step of combining further comprises calculating the output mantissa according to:

$$\hat{f}(x) = f(x_0) + \sum_{i=1}^{N} a_i (\Delta x)^i$$

where: $\hat{f}(x)$ is the output mantissa;
$x_0$ is a value of the first portion of the input mantissa;
$f(x_0)$ is the point value;
$\Delta x$ is a value of the second portion of the input mantissa;
$a_i$ is an i'th slope value of the at least one slope value; and
N is an order of the LaGrange polynomial approximation of the function.

4. The method of claim 3, wherein N=3 and the LaGrange polynomial approximation of the function comprises a third-order LaGrange polynomial approximation of the function.

5. The method of claim 3, further comprising steps of:
   deriving the at least one slope value, $a_i$, by factoring the LaGrange polynomial approximation of the function by $(\Delta x)^i$.

6. The method of claim 1, further comprising steps of:
   processing the input exponent according to the function to provide the output exponent; and
   combining the output mantissa and the output exponent to provide the output value.

7. An apparatus for calculating an output value of a function based on an input value, wherein the input value comprises an input mantissa and an input exponent, the input mantissa further comprising a first portion and a second portion, and wherein the output value comprises an output mantissa and an output exponent, the apparatus comprising:
   memory containing a plurality of point values and a plurality of slope values;
   means for providing a point value stored in the memory based on the first portion of the input mantissa;
   means, coupled to the means for providing the point value and the means for providing the at least one slope value, for converting the input value such that the input mantissa is within a predefined range;
   means for providing at least one slope value stored in the memory based on the first portion of the input mantissa, wherein each of the at least one slope value is based on a LaGrange polynomial approximation of the function; and
   means, coupled to the means for providing the point value and to the means for providing the at least one slope value, for combining the point value, the at least one slope value and the second portion of the input mantissa to provide the output mantissa.

8. The apparatus of claim 7, wherein the function is any function selected from a group comprising: a reciprocal function, a reciprocal square root function, an exponential function and a logarithm function.

9. The apparatus of claim 7, wherein the means for combining further comprises calculating the output mantissa according to:

$$\hat{f}(x) = f(x_0) + \sum_{i=1}^{N} a_i (\Delta x)^i$$

where: $\hat{f}(x)$ is the output mantissa;
$x_0$ is a value of the first portion of the input mantissa;
$f(x_0)$ is the point value;
$\Delta x$ is a value of the second portion of the input mantissa;
$a_i$ is an i'th slope value of the at least one slope value; and
N is an order of the LaGrange polynomial approximation of the function.

10. The apparatus of claim 9, wherein N=3 and the LaGrange polynomial approximation of the function comprises a third-order LaGrange polynomial approximation of the function.

11. The apparatus of claim 7, further comprising:
means for processing the input exponent according to the function to provide the output exponent; and
means, coupled to the means for combining to provide the output mantissa and coupled to the means for processing the input exponent, for combining the output mantissa and the output exponent to provide the output value.

12. A graphics processing circuit for calculating an output value of a function based on an input value, wherein the input value comprises an input mantissa and an input exponent, the input mantissa further comprising a first portion and a second portion, and wherein the output value comprises an output mantissa and an output exponent, the graphics processing circuit comprising:
a point value table that provides a point value based on the first portion of the input mantissa;
an input conversion circuit, positioned to receive the input value and coupled to the point value table and the at least one slope value table, that normalizes the input value such that the input mantissa is within a predefined range;
at least one slope value table, wherein each of the at least one slope value table provides a slope value based on the first portion of the input mantissa to provide at least one slope value, wherein each of the at least one slope value is based on a LaGrange polynomial approximation of the function;
at least one multiplier that multiplies successive ones of the at least one slope value with successive powers of the second portion of the input mantissa to provide at least one slope product; and
an adder that sums the point value and the at least one slope product to provide the output mantissa.

13. The graphics processing circuit of claim 12, further comprising an output conversion circuit, positioned to receive the output mantissa and an unbiased version of the input exponent, that converts the output mantissa and the unbiased version of the input exponent from a fixed-point to a floating-point format.

14. The graphics processing circuit of claim 12, wherein the function is any function selected from a group comprising: a reciprocal function, a reciprocal square root function, an exponential function and a logarithm function.

15. The graphics processing circuit of claim 12, wherein the at least one multiplier and the adder operate in conjunction to provide the output mantissa according to:

$$\hat{f}(x) = f(x_0) + \sum_{i=1}^{N} a_i (\Delta x)^i$$

where: $\hat{f}(x)$ is the output mantissa;
$x_0$ is a value of the first portion of the input mantissa;
$f(x_0)$ is the point value;
$\Delta x$ is a value of the second portion of the input mantissa;
$a_i(\Delta x)^i$ is an i'th slope value of the at least one slope value; and
N is an order of the LaGrange polynomial approximation of the function.

16. The graphics processing circuit of claim 15, wherein N=3 and the LaGrange polynomial approximation of the function comprises a third-order LaGrange polynomial approximation of the function.

* * * * *